Oct. 30, 1962  T. R. DOWNS  3,060,891
CLOCK OPERATED ANIMAL FEEDER DISPENSER
Filed Sept. 14, 1961
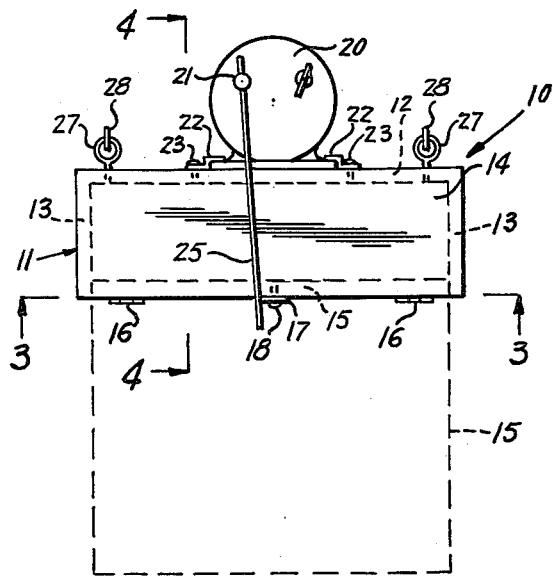
FIG. 2
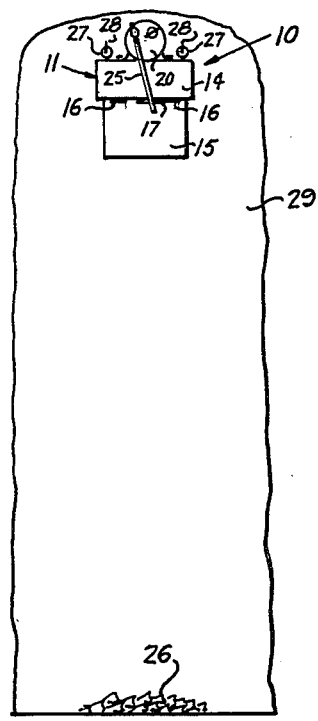
FIG. 1
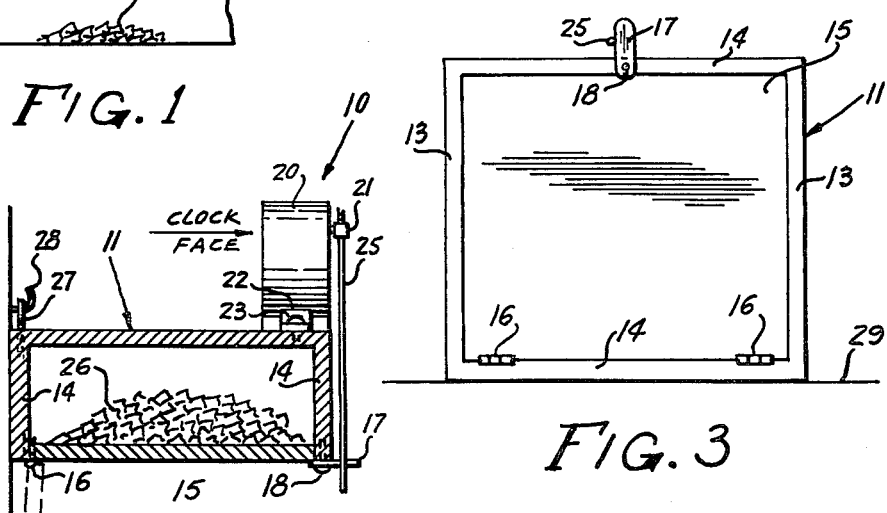
FIG. 3
FIG. 4
INVENTOR.
THOMAS R. DOWNS
BY
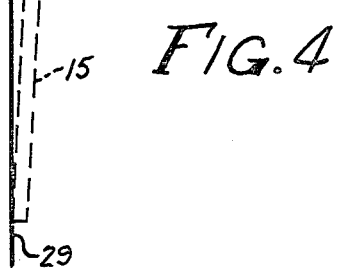
ATTORNEYS.

United States Patent Office 3,060,891
Patented Oct. 30, 1962

3,060,891
CLOCK OPERATED ANIMAL FEEDER DISPENSER
Thomas R. Downs, 2116 Roanoke St.,
Del Paso Heights, Calif.
Filed Sept. 14, 1961, Ser. No. 138,162
1 Claim. (Cl. 119—51.15)

This invention relates to an automatic animal feeder and more particularly to a device which will automatically feed a pet animal such as a dog at a predetermined time in the absence of the owner.

A primary object of the invention is the provision of a device of this character provided with timed means which may be set at a predetermined hour to release dog biscuits or other suitable food for consumption by the animal at that particular time.

A further object of the invention is the provision of a device which will provide means for automatically feeding a pet during the absence of the owner.

Still another object of the invention is the provision of such a device which is actuated by the unwinding mechanism of a conventional alarm clock, and which may be set at any desired hour.

Still another object of the invention is the provision of such a device which is sturdy and durable in construction, reliable and efficient in operation, and relatively simple and inexpensive to manufacture.

Still other objects reside in the combinations of elements, arrangements of parts, and features of construction, all as will be more fully pointed out hereinafter and disclosed in the accompanying drawing wherein:

FIGURE 1 is a front elevational view of the feeder of the instant invention shown as secured to a wall at a height above the reach of the animal.

FIGURE 2 is an enlarged front view of the construction of FIG. 1, an alternative position of adjustment being being indicated in dotted lines.

FIGURE 3 is a bottom plan view of the device taken substantially along the line 3—3 of FIG. 2 as viewed in the direction indicated by the arrows; and FIG. 4 is a sectional view taken substantially along the line 4—4 of FIG. 2 as viewed in the direction indicated by the arrows.

Similar reference characters refer to similar parts throughout the several views of the drawing.

Referring now to the drawings in detail, the feeder of the instant invention is generally indicated at 10 and comprises a receptacle generally indicated at 11 including a closed top wall 12, side walls 13, and end walls 14. A bottom 15 is hinged as by means of hinges 16 to one of the end walls 14, and is held in position by means of a pivoted latch member 17 which is mounted on a pivot pin 18 secured in the opposite wall 14.

Mounted on top wall 12 adjacent and aligned with the end wall 14 carrying latch member 17 is a conventional alarm clock 20 of the type having an alarm winding stem 21 which rotates as the alarm is actuated. Suitable brackets 22 and screws 23 hold the clock in proper position on top wall 12. In the embodiment of the invention herein shown the conventional handle for the winding stem is removed and an elongated rod 25 is attached to stem 21, the rod being of a length sufficient to extend below the bottom wall 15 when in closed position and aligned with the extending portion of the latch member 17. The arrangement is thus such that when the alarm is actuated after previous setting rotation of the winding stem 21 will cause the rod 25 to move to engage the projecting end of latch 17 and move the same about its pivot 18 to release the bottom 15 which falls to the dotted line position shown in FIG. 4 with the full line position shown in FIG. 1. At this time dog food 25 or the like is released from the receptacle 11 to fall to either the floor or into a suitable dish for feeding the animal.

Eyes 27 are provided on top wall 12 adjacent the rear wall 14 which carries hinges 16 and are adapted to be engaged by suitable hooks 28 which are set in the wall 29 at a height sufficient normally to position the device out of reach of a pet.

In the use and operation of the device the receptacle 11 is removed from the wall and inverted, the bottom 15 opened and dog biscuits or other dry animal food positioned within the container. The bottom 15 is then closed by means of latch member 17, and the eyes 27 positioned over the hooks 28 to support the receptacle a suitable distance above the floor.

The alarm is set for any desired hour, and when the alarm is actuated, the stem 21 will rotate until the rod 25 contacts the extending arm 17 of the latch member, at which time the food will be released for consumption by the animal.

From the foregoing it will now be seen that there is herein provided an improved and simplified automatic animal feeding device which accomplishes all the objects of this invention, and others, including many advantages of great practical utility.

As many embodiments may be made of this inventive concept, and as many modifications may be made in the embodiment hereinbefore shown and described, it is to be understood that all matter herein is to be interpreted merely as illustrative, and not in a limiting sense.

I claim:

An automatic animal feeding device comprising a receptacle having a top, side walls, a rear wall, a front wall, and a hinged bottom, said bottom being hinged to said rear wall, a latch having a horizontal portion pivoted to the bottom of said front wall, a portion of the latch underlying said bottom normally retaining said bottom in closed position, and a portion extending forwardly of said front wall, an alarm clock mounted on said top of said receptacle, and having the rear thereof in alignment with the outer surface of said front wall, said alarm clock having a winding stem and handle therefor rotatable to set said alarm clock at a predetremined time, said stem and handle rotating during the actuation of the alarm, an arm in movable contact with the forwardly extending portion of said latch at said predetermined time to release said bottom to permit animal food contained therein to fall by gravity, said arm being fixedly and dependingly secured to said stem and handle for rotation thereby in a vertical plane in front of said front wall, and eyes secured to the top of said receptacle adapted to engage hooks secured to a wall to suspend said receptacle above the floor at a height normally out of reach of an animal.

References Cited in the file of this patent

UNITED STATES PATENTS

| 1,076,193 | Daminaitis | Oct. 21, 1913 |
| 1,214,314 | Kamada et al. | Jan. 30, 1917 |
| 1,429,297 | O'Neill et al. | Sept. 19, 1922 |

FOREIGN PATENTS

| 198,088 | Great Britain | May 31, 1923 |